United States Patent
Yuan et al.

(10) Patent No.: US 10,449,633 B1
(45) Date of Patent: Oct. 22, 2019

(54) GAS PRESSURE FORMING METHOD OF ELLIPSOIDAL SHELLS BASED ON CURRENT SELF-RESISTANCE HEATING

(71) Applicant: Dalian University of Technology, Dalian (CN)

(72) Inventors: Shijian Yuan, Dalian (CN); Xiaobo Fan, Dalian (CN)

(73) Assignee: Dalian University of Technology, Dalian (CN)

( * ) Notice: Subject to any disclaimer, the term of this patent is extended or adjusted under 35 U.S.C. 154(b) by 0 days.

(21) Appl. No.: 16/391,433

(22) Filed: Apr. 23, 2019

(30) Foreign Application Priority Data

Mar. 13, 2019 (CN) .......................... 2019 1 0187228

(51) Int. Cl.
| | |
|---|---|
| *B23K 26/26* | (2014.01) |
| *B23K 20/12* | (2006.01) |
| *B23K 9/025* | (2006.01) |
| *B23K 103/10* | (2006.01) |

(52) U.S. Cl.
CPC .............. *B23K 26/26* (2013.01); *B23K 9/025* (2013.01); *B23K 20/122* (2013.01); *B23K 20/129* (2013.01); *B23K 2103/10* (2018.08)

(58) Field of Classification Search
CPC .............. B23K 11/002; B23K 11/0026; B23K 11/0065; B23K 11/061; B23K 11/063; B23K 26/26; B23K 20/129; B23K 9/025; B23K 20/122; B23K 2103/10
See application file for complete search history.

(56) References Cited

U.S. PATENT DOCUMENTS

| | | | | |
|---|---|---|---|---|
| 1,966,241 A | * | 7/1934 | Furrer ....................... | F17C 1/00 219/137 R |
| 2,579,646 A | * | 12/1951 | Branson ................. | B21D 51/24 220/581 |
| 2,731,334 A | * | 1/1956 | Wissmiller ................ | E04H 7/14 220/567 |
| 3,183,519 A | * | 5/1965 | Harris .................... | A61B 3/107 351/205 |
| 3,921,555 A | * | 11/1975 | Suzuki ...................... | E04H 7/14 228/138 |
| 3,945,236 A | * | 3/1976 | Hooper .................. | B21D 51/24 72/340 |
| 4,004,429 A | * | 1/1977 | Mouton, Jr. ............ | E02D 29/00 405/188 |

(Continued)

*Primary Examiner* — Geoffrey S Evans
(74) *Attorney, Agent, or Firm* — IP Attorneys Group, LLC (57) ABSTRACT

The present invention discloses a gas pressure forming method of an ellipsoid. The formability of a closed polyhedral shell including polar plates, ellipsoidal side flap plates, and welded joints is improved, and the closed polyhedral shell is pressurized into an ellipsoid by using compressed gas under a heating condition, specifically comprising: assembling and welding two polar plates and ellipsoidal side flap plates into a closed polyhedral shell; disposing an electrode on the closed polyhedral shell, energizing and heating to a preset temperature, and then inflating compressed gas into the shell; deforming the closed polyhedral shell under the action of internal gas pressure, stopping inflating gas until a desired curvature shell is obtained, discharging gas, and removing the electrode to obtain a formed ellipsoid.

8 Claims, 3 Drawing Sheets

(56) References Cited

U.S. PATENT DOCUMENTS

| | | | | |
|---|---|---|---|---|
| 4,223,797 | A * | 9/1980 | Skakunov | B65D 90/205 220/565 |
| 2010/0213244 | A1 * | 8/2010 | Miryekta | B23K 20/122 228/112.1 |
| 2011/0051147 | A1 * | 3/2011 | Evans | G01B 11/161 356/513 |
| 2018/0111221 | A1 * | 4/2018 | Larsson | B23K 20/1245 |

* cited by examiner

GAS PRESSURE FORMING METHOD OF ELLIPSOIDAL SHELLS BASED ON CURRENT SELF-RESISTANCE HEATING

This application claims priority to Chinese application number 201910187228.9, filed Mar. 13, 2019, with a title of GAS PRESSURE FORMING METHOD of ELLIPSOID BASED ON CURRENT SELF-RESISTANCE HEATING. The above-mentioned patent application is incorporated herein by reference in its entirety.

TECHNICAL FIELD

The present invention relates to the technical field of ellipsoidal shells forming, and in particular, to a gas pressure forming method of an ellipsoidal shell based on current self-resistance heating.

BACKGROUND

The ellipsoidal shells are widely used in thin-walled containers such as large water towers, petrochemical containers, and cylindrical container heads due to the advantages of the small wind area, large capacity, uniform stress and attractive outline, etc. With the increasing requirements of lightweight, large-diameter aluminum alloy ellipsoidal shells with high specific strength and good corrosion resistance are gradually widely used, such as the aluminum alloy ellipsoidal dome of launch vehicle fuel tanks, the aluminum alloy ellipsoidal dome of upper-stage fuel tanks, and marine liquefied gas aluminum alloy storage tanks, etc.

The conventional forming method of an ellipsoidal shell is generally performed by first petal forming in the dies, and then assembling and welding the petals into an integral ellipsoidal shell. Since the curvature radius of the ellipsoidal shell gradually changes from the polar point to the equator, an ellipsoidal shell with one size diameter also requires multiple sets of dies when the conventional die forming is used, which limits the wide application of the ellipsoidal shell. To solve the manufacturing problems existing in the conventional method for the ellipsoidal shell, an overall dieless hydroforming method for the ellipsoidal shell has been developed. The method includes first cutting a plate into several side petals and two polar plates, roll-bending the side petals into single-curvature shell plates of a certain shape, and then assembling and welding the single-curvature shell plates and the polar plates into a closed shell inscribed with an ellipsoid, and finally filling a liquid medium to pressurize the polyhedral shell into an ellipsoidal shell. The method does not require a die and a press, and thus can significantly reduce the manufacturing costs of the large-diameter ellipsoids, and can realize the dieless hydroforming of ellipsoidal shells with different axial ratios. At present, dieless hydroforming has successfully produced low carbon steel and stainless steel ellipsoid, which is applied to water supply, paper making, liquefied petroleum gas, architectural decoration, urban scenic spots, and flight simulation ball screens in the field of national defenses, etc.

However, due to the low room temperature formability of the aluminum alloy, especially the strength and formability of the welded joint are much lower than those of the base metal (the strength of the aluminum alloy fusion-welded joint is 60% of the base metal, and the friction stir welded joint is 80% of the base metal). It is easy to cause the rapture defects in the weld zone when the dieless hydroforming is performed at room temperature, resulting in failure to form a qualified ellipsoidal shell. To improve the formability of aluminum alloy and its welded joint, it is necessary to carry out the forming at elevated temperature. For large-diameter ellipsoidal shells (e.g., the diameters greater than 3 m, even up to 10 m), if heating is carried out in a heating furnace, a large-sized heating furnace is required. Thus the equipment cost is extremely high, and moreover, the temperature uniformity of the large-sized heating furnace is strictly controlled That is, the technical risk is very high, and it is difficult to execute the gas pressure forming in the large-sized heating furnace.

SUMMARY

An objective of the present invention is to provide a gas pressure forming method of an ellipsoidal shell based on current self-resistance heating, to solve the foregoing problems in the prior art, and the formability of a closed polyhedral shell including polar plates, ellipsoidal side petal plates and welds was increased through current self-resistance heating, to solve the problem of fracture in the weld zone while hydroforming the large-diameter aluminum alloy ellipsoid, thereby avoiding using the large-sized heating furnace and greatly reducing the manufacturing costs.

To achieve the above objective, the present invention provides the following solution.

A gas pressure forming method of an ellipsoidal shell is provided, where the formability of a closed polyhedral shell including polar plates, ellipsoidal side petal plates, and welded joints was improved through current self-resistance heating, and the closed polyhedral shell is pressurized into an ellipsoidal shell by using compressed gas under a heating condition, and the method specifically includes:

step 1, obtaining two polar plates and a plurality of ellipsoidal side petal plates according to a preset axial ratio;

step 2, assembling and welding the polar plates and the ellipsoidal side petal plates to form a closed polyhedral shell;

step 3, disposing an electrode on the closed polyhedral shell to form a closed current loop, and energizing and heating the closed polyhedral shell to a preset forming temperature;

step 4, inflating compressed gas into the heated closed polyhedral shell;

step 5, detecting a curvature change of the closed polyhedral shell after the compressed gas is inflated, and stopping inflating the compressed gas when a curvature value of the closed polyhedral shell reaches a preset curvature value, discharging the gas inside the closed polyhedral shell, and removing the electrode to obtain a formed ellipsoidal shell.

Optionally, in step 2, the welding mode is one of friction stir welding, arc welding, and laser welding.

Optionally, the method of disposing an electrode on the closed polyhedral shell in step 3 specifically includes: disposing a first electrode and a second electrode on the two polar plates of the closed polyhedral shell, respectively.

Optionally, the method of disposing an electrode on the closed polyhedral shell in step 3 specifically includes: disposing a first electrode and a second electrode on the two electrode plates of the closed polyhedral shell, respectively; and disposing a third electrode on an equatorial zone of the closed polyhedral shell.

Optionally, the preset forming temperature is 200-500° C.

Optionally, the compressed gas is one of air, nitrogen, and argon, and the pressure intensity of the compressed gas is less than 10 MPa.

Optionally, the preset axial ratio is 0.5-5.

Optionally, the polar plates and the ellipsoidal side petal plates are made of one of 2000-series, 5000-series, 6000-series, 7000-series, and 8000-series aluminum alloys; and the thicknesses of the polar plate and the ellipsoidal side petal plates are less than 30 mm.

Compared with the prior art, beneficial effects of the present invention lie in:

The present invention proposes a gas pressure forming method of an ellipsoidal shell based on current self-resistance heating, adopts a current self-resistance heating mode to directly heat the closed polyhedral shell, thereby avoiding using a large-sized heating furnace and greatly reducing the manufacturing cost and technical risk of the large-diameter ellipsoidal shells forming. The polar plates, the ellipsoidal side petal plates, and the welded joints are subjected to gas pressure bulging in a heating state, the formability is significantly improved, and the problem of cracking of weld zones of the large-diameter ellipsoidal shell at the normal temperature forming is solved.

In addition, by means of current self-resistance heating, the ellipsoidal shell could be heated efficiently and uniformly through the optimal arrangement of electrodes, and the materials for ellipsoidal forming that are difficult to deform at room temperature such as aluminum alloy is realized.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

In the drawings, 1—polar plate, 2—ellipsoidal side petal plate, 3—weld, 4—first electrode, 5 second electrode, 6—power supply, 7—third electrode, 8—pressure loading controller, and 9—gas container.

DETAILED DESCRIPTION

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An objective of the present invention is to provide a gas pressure forming method of an ellipsoidal shell based on current self-resistance heating, and the formability of a closed polyhedral shell including polar plates, ellipsoidal side petal plates and welded joints was improved through current self-resistance heating, to solve the problem of rapture of the large-diameter aluminum alloy ellipsoidal shells during normal temperature forming process, thereby avoiding using a large-sized heating furnace and greatly reducing the manufacturing costs and technical risks.

To make the foregoing objective, features, and advantages of the present invention clearer and more comprehensible, the present invention is further described in detail below with reference to the accompanying drawings and specific embodiments.

Embodiment 1

Figure 1:
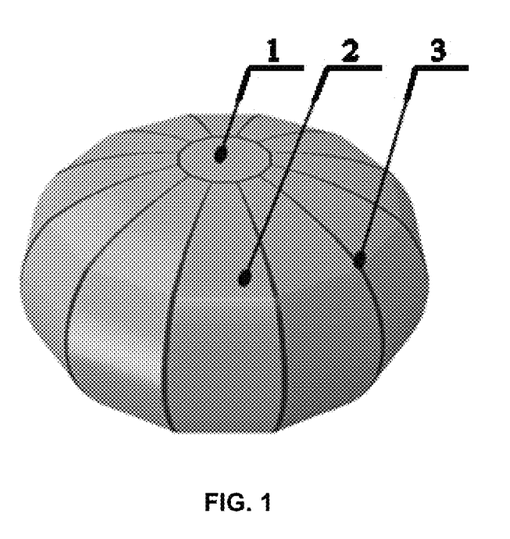
FIG. 1 is a schematic structural diagram of a closed polyhedral shell according to an embodiment of the present invention.

FIG. 1 is a schematic structural diagram of a closed polyhedral shell according to an embodiment of the present invention. As shown in FIG. 1, this embodiment provides an aluminum alloy gas pressure forming method of an ellipsoidal shell based on current self-resistance heating. The closed polyhedral shell is formed by assembling and welding polar plates 1 and ellipsoidal side petal plates 2 through current self-resistance heating, and a weld 3 is formed between two ellipsoidal side petal plates, the formability of the aluminum alloy and its welded joint is improved through current self-resistance heating, and the polyhedral shell is pressurized into an ellipsoidal shell by using the compressed gas at high temperature.

Figure 2:
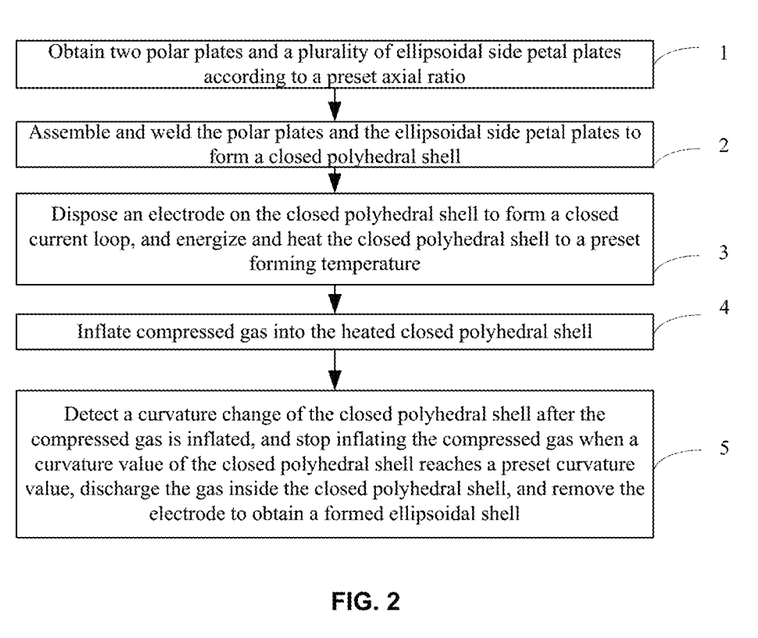
FIG. 2 is a flowchart of a gas pressure forming method of an ellipsoidal shell according to an embodiment of the present invention.

FIG. 2 is a flowchart of a gas pressure forming method of an ellipsoidal shell according to an embodiment of the present invention. As shown in FIG. 2, the gas pressure forming method of an ellipsoidal shell provided by the present invention includes specific steps as follows.

Step 1, two polar plates and a plurality of ellipsoidal side petal plates are obtained according to a preset axial ratio.

Two polar plates 1 and a plurality of ellipsoidal side petal plates 2 are obtained according to a preset axial ratio A. The axial ratio A is a ratio of a major semi-axis to a minor semi-axis of a horizontal elliptical surface passing the center of the ellipsoid.

Figure 3:
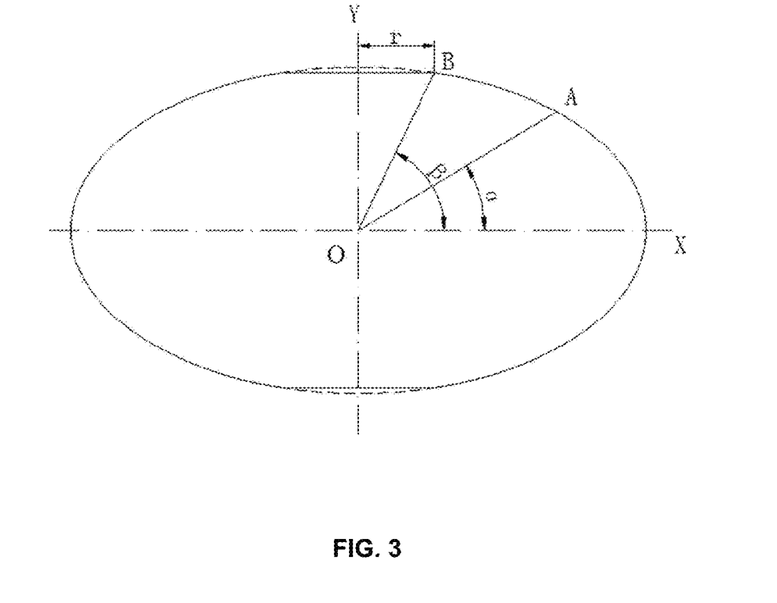
FIG. 3 is a schematic diagram showing the geometric structure of an ellipsoidal shell according to an embodiment of the present invention.

(1) Determining of the polar plates: the two polar plates have the same shape and size, and are circular plates. FIG. 3 is a schematic diagram of the geometric structure of an ellipsoidal shell according to an embodiment of the present invention. As shown in FIG. 3, the diameter of the circular plate is determined by an angle $\beta$, the range of the angle $\beta$ is 70-85°, the angle $\beta$ is an angle between a line connecting the center of the ellipsoidal shell to a certain point on the curve and the major axis when the axial ratio is $\lambda$, and the distance from the point to the minor axis is the radius r of the polar plate. The diameters of the two polar plates are the same.

(2) Determining of the ellipsoidal side petal plates: the arc-shaped structures of the plurality of ellipsoidal side petal plates are the same, and the arc surface of the side petal is determined according to the preset axial ratio: the ellipsoidal side petal plate is a single-curvature arc plate when the axial ratio is $1-\sqrt{2}$, and the arc surface of the ellipsoidal side petal plate is a double-curvature arc plate when the axial ratio is greater than $\sqrt{2}$. The double-curvature arc plate consists of an elliptical single-curvature arc plate with a preset axial ratio (the axial ratio is greater than $\sqrt{2}$) and an elliptical single-curvature arc plate with an axial ratio of 1-$\sqrt{2}$. There are 8-16 ellipsoidal side petal plates, and the ellipsoidal side petal plates are blanked through a straight panel and then roll-bent on a roll bending machine.

Step 2, the polar plates 1 and the ellipsoidal side petal plates 2 are assembled and welded to form a closed polyhedral shell.

Multi-point spot welding is carried out on the side edges of the ellipsoidal side petal plates 2 in pairs to assemble a polyhedral shell, one polar plate is welded to the upper edges of the ellipsoidal side petal plates 2, and the other polar plate is welded to the lower edges of the ellipsoidal side petal plates 2, such that the two polar plates 1 and the ellipsoidal side petal plates 2 form a closed ellipsoidal shell; and finally, the assembled polyhedral shell is welded into a closed polyhedral shell. Preferably, the welding mode is one of friction stir welding, electric arc welding, and laser welding.

Step 3, an electrode is disposed on the closed polyhedral shell to form a closed current loop, and the closed polyhedral shell is energized and heated to a preset forming temperature.

The preset forming temperature is determined according to the high-temperature formability of the aluminum alloy and the welded joint, and the heating temperature is 200-500° C.

Figure 4:
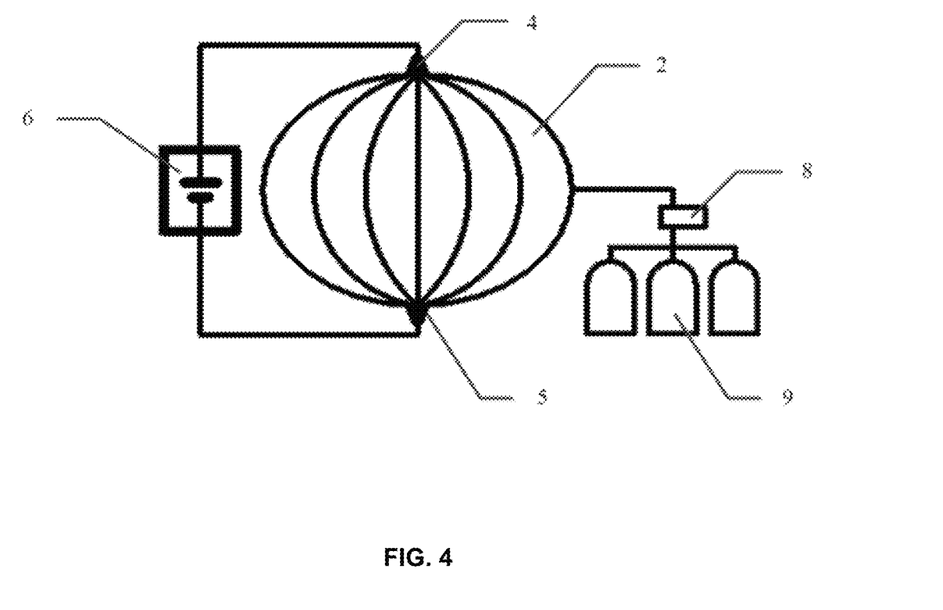
FIG. 4 is a schematic diagram showing an ellipsoidal shell gas pressure forming process according to an embodiment of the present invention.

FIG. 4 is a schematic diagram showing an ellipsoidal shell gas pressure forming process according to an embodiment of the present invention. As shown in FIG. 4, the electrode is disposed on the closed ellipsoidal shell in such a manner that a first electrode 4 is disposed on one of the polar plates, and a second electrode 5 is disposed on the other polar plate; and an anode of a power supply 6 is connected to the first electrode 4, and a cathode of the power supply 6 is connected to the second electrode 5 to form a closed current loop. The power supply 6 adopts a direct-current power supply.

Figure 5:
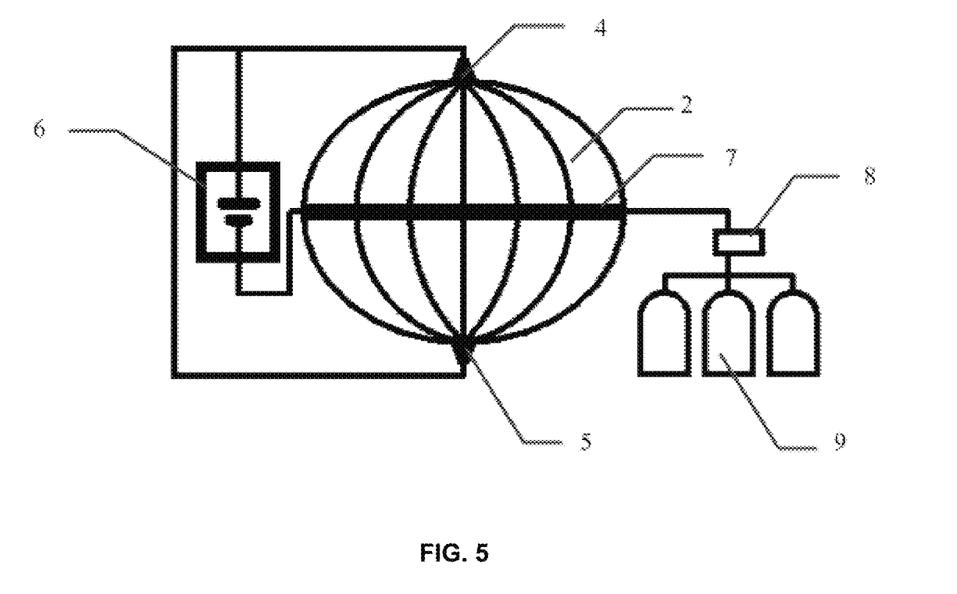
FIG. 5 is a schematic diagram showing another ellipsoid gas pressure forming process according to an embodiment of the present invention.

FIG. 5 is a schematic diagram showing another ellipsoid gas pressure forming process according to an embodiment of the present invention. As shown in FIG. 5, the electrode is disposed on the closed ellipsoidal shell in another manner that a first electrode 4 is disposed on one of the polar plates, a second electrode 5 is disposed on the other polar plate, and a third electrode 7 is disposed on an equatorial zone of the closed ellipsoidal shell; and an anode of a power supply 6 is respectively connected to the first electrode 4 and the second electrode 5, and a cathode of the power supply 6 is connected to the third electrode 7 to form a closed current loop. The power supply 6 adopts a direct-current power supply.

Step 4, compressed gas is inflated into the heated closed polyhedral shell.

The compressed gas is inflated into the heated closed polyhedral shell, and the closed polyhedral shell is deformed under the action of internal high-pressure gas. Inflation of the compressed gas is carried out by controlling a gas loading controller 8 to fill the heated closed ellipsoidal shell with the compressed gas in a gas container 9 according to a process curve, and disposing an inflating joint on any of the ellipsoidal side petal plates. The process curve is a pressure-time curve or a pressure-volume curve. The compressed gas is one of air, nitrogen, and argon, and the pressure intensity of the compressed gas is less than 10 MPa.

Step 5, a curvature change of the closed polyhedral shell after the compressed gas is inflated is detected, and the inflation of compressed gas is stopped when a curvature value of the closed polyhedral shell reaches a preset curvature value, the gas inside the closed polyhedral shell is discharged, and the electrode is removed to obtain a formed ellipsoidal shell.

The ellipsoidal shell has a diameter of 100-10,000 mm and an axial ratio of 0.5-5. The polar plates and the ellipsoidal side petal plates are made of one of 2000-series, 5000-series, 6000-series, 7000-series and 8000-series aluminum alloys. The thicknesses of the polar plates and the ellipsoidal side petal plates are less than 30 mm.

This embodiment directly heats the ellipsoidal shell through the direct-current power supply 6, thereby avoiding using a large-size heating furnace and greatly reducing the manufacturing cost and technical risk of the forming of large-diameter ellipsoidal shells. The aluminum alloy and the welded joints are subjected to gas pressure bulging in a heating state, the formability is significantly improved, and the problem of rapture in the weld zones of the large-diameter aluminum alloy ellipsoidal shell at the normal temperature forming is solved. By means of current self-resistance heating, the ellipsoidal shell could be heated efficiently and uniformly through the optimal arrangement of electrodes, and the materials for ellipsoidal forming that are difficult to deform at room temperature such as aluminum alloy are realized.

Embodiment 2

As shown in FIGS. 1-5, this embodiment provides an aluminum alloy gas pressure forming method of an ellipsoidal shell based on current self-resistance heating. The formability of the aluminum alloy and the welded joints is improved by means of current self-resistance heating, without using the heating furnace, and the polyhedral shell is pressurized into an ellipsoidal shell by using the compressed gas at high temperature. The polar plates and the ellipsoidal side petal plates are made of 2219 aluminum alloy plates with the thickness of 8.0 mm, the major axis diameter of the ellipsoidal shell is 3,350 mm, and the axial ratio is 1.4. The gas pressure forming method of ellipsoidal shells provided by this embodiment includes specific steps as follows.

Step 1, two polar plates 1 and a plurality of ellipsoidal side petal plates 2 are obtained according to a preset axial ratio.

Two polar plates and a plurality of ellipsoidal side petal plates are obtained according to an axial ratio of 1.4, where the angle β is 70° and the diameter of the polar plates is 800 mm. There are 12 side petals, and the side petals are single-curvature arc plates. The side petals are roll-bent on a roll bending machine after blanking, to form ellipsoidal side petal plates having a major axis diameter of 3,250 m and a minor axis diameter of 2,000 mm.

Step 2, the polar plates 1 and the ellipsoidal side petal plates 2 are assembled and welded to form a closed polyhedral shell.

The two polar plates 1 and the 12 ellipsoidal side petal plates 2 are assembled and welded to form a closed polyhedral shell. Multi-point spot welding is carried out on the side edges of the ellipsoidal side petal plates 2 in pairs to assemble a polyhedral shell, one polar plate is welded to the upper edges of the ellipsoidal side petal plates 2, and the other polar plate is welded to the lower edges of the ellipsoidal side petal plates 2, such that the two polar plates 1 and the ellipsoidal side petal plates 2 form a closed ellipsoidal shell; and finally, the assembled polyhedral shell is welded into a closed polyhedral shell. The welding mode is electric arc welding.

Step 3, an electrode is disposed on the closed polyhedral shell to form a closed current loop, and the closed polyhedral shell is energized and heated to a preset forming temperature. The forming temperature is 300° C.

The electrode is disposed on the closed ellipsoidal shell in such a manner that a first electrode 4 is disposed on one of the polar plates, and a second electrode 5 is disposed on the other polar plate; and an anode of a power supply 6 is connected to the first electrode 4, and a cathode of the power supply 6 is connected to the second electrode 5 to form a closed current loop.

Step 4, compressed gas is inflated into the heated closed polyhedral shell.

The compressed gas is inflated into the heated closed polyhedral shell, and the closed polyhedral shell is deformed under the action of internal high-pressure gas. Inflation of the compressed gas is carried out by controlling a gas loading controller 8 to fill the heated closed ellipsoidal shell with the compressed gas in a gas container 9 according to a process curve, and disposing an inflating joint on any of the ellipsoidal side petal plates. The process curve is a pressure-time curve. The compressed gas can also be one of nitrogen and argon, and the compressed gas pressure is a gas pressure of 0.5 MPa, so that the closed ellipsoidal shell is deformed under the action of the internal high-pressure gas.

Step 5, a curvature change of the closed polyhedral shell after the compressed gas is inflated is detected, and the inflation of compressed gas is stopped when a curvature value of the closed polyhedral shell reaches a preset curvature value, the gas inside the closed polyhedral shell is discharged, and the electrode is removed to obtain a formed ellipsoid. The curvature change of the polyhedral shell is measured by an optical measuring instrument. The major axis diameter of the aluminum alloy ellipsoidal shell is 3,350 mm, and the axial ratio is 1.4.

In conclusion, according to the ellipsoidal shell hot gas pressure forming method of the present invention, the material and the welded joints are subjected to gas pressure bulging in the heating state, and the formability is significantly improved, thereby solving the problem of rupture in dieless hydroforming of the light alloy ellipsoidal shell. The ellipsoidal shell is directly heated by means of current self-resistance heating, thereby avoiding using a large-sized heating furnace, greatly reducing the cost and shortening the manufacturing cycle.

Embodiment 3

As shown in FIGS. 1-5, this embodiment provides an aluminum alloy gas pressure forming method of ellipsoidal shell based on current self-resistance heating. The formability of the aluminum alloy and the welded joints is improved by means of current self-resistance heating, and the polyhedral shell is pressurized into an ellipsoidal shell by using the compressed gas at high temperature. The polar plates and the ellipsoidal side petal plates are made of 6061 aluminum alloy plates with the thickness of 8.0 mm, the major axis diameter of the ellipsoidal shell is 5,500 mm, and the axial ratio is 1.4. Different from Embodiment 2, this embodiment optimally arranges the electrodes at the central region (the equatorial zone) of the side petals and the polar plates to form a plurality of closed current loops for efficient and uniform heating of the closed ellipsoidal shell. The gas pressure forming method of ellipsoidal shells provided by the present invention includes specific steps as follows.

Step 1, two polar plates and a plurality of ellipsoidal side petal plates are obtained according to a preset axial ratio.

Two polar plates and a plurality of ellipsoidal side petal plates are obtained according to an axial ratio of 1.4, where the angle β is 75° and the diameter of the polar plates is 1,200 mm. There are 16 side petals, and the side petals are single-curvature arc plates. The side petals are roll-bent on a roll bending machine after blanking, to form ellipsoidal side petal plates having a major axis diameter of 5,400 m and a minor axis diameter of 4,250 mm.

Step 2, the polar plates 1 and the ellipsoidal side petal plates 2 are assembled and welded to form a closed polyhedral shell.

The two polar plates 1 and the 16 ellipsoidal side petal plates 2 are assembled into a polyhedral shell. Multi-point spot welding is carried out on the side edges of the ellipsoidal side petal plates 2 in pairs to assemble the polyhedral shell, one polar plate is welded to the upper edges of the ellipsoidal side petal plates 2, and the other polar plate is welded to the lower edges of the ellipsoidal side petal plates 2, such that the two polar plates 1 and the ellipsoidal side petal plates 2 form a closed ellipsoidal shell; and finally, the assembled polyhedral shell is welded into a closed polyhedral shell. The welding mode is laser welding.

Step 3, an electrode is disposed on the closed polyhedral shell to form a closed current loop, and the closed polyhedral shell is energized and heated to a preset forming temperature.

The electrode is disposed on the closed ellipsoidal shell in such a manner that a first electrode 4 is disposed on one of the polar plates, a second electrode 5 is disposed on the other polar plate, and a third electrode 7 is disposed on an equatorial zone of the closed ellipsoidal shell; an anode of a power supply 6 is respectively connected to the first electrode 4 and the second electrode 5, and a cathode of the power supply 6 is connected to the third electrode 7 to form a closed current loop; and the power supply 6 is turned on to energize and heat the closed ellipsoidal shell to 350° C. The power supply 6 adopts a direct-current power supply.

Step 4, compressed gas is inflated into the heated closed polyhedral shell.

The compressed gas is inflated into the heated closed polyhedral shell, and the closed polyhedral shell is deformed under the action of internal high-pressure gas.

Inflation of the compressed gas is carried out by controlling a gas loading controller 8 to fill the heated closed ellipsoidal shell with the compressed gas in a gas container 9 according to a process curve, and disposing an inflating joint on any of the ellipsoidal side petal plates. The process curve is a pressure-time curve. The pressure intensity of the compressed gas is 0.5 MPa.

Step 5, a curvature change of the closed polyhedral shell after the compressed gas is inflated is detected, and the inflation of compressed gas is stopped when a curvature value of the closed polyhedral shell reaches a preset curvature value, the gas inside the closed polyhedral shell is discharged, and the electrode is removed to obtain a formed ellipsoid. The curvature change of the polyhedral shell is measured by an optical measuring instrument. The major axis diameter of the aluminum alloy ellipsoidal shell is 5,500 mm, and the axial ratio is 1.4.

The compressed gas in this embodiment can be replaced with nitrogen or argon.

In conclusion, according to the ellipsoidal shell hot gas pressure forming method of the present invention, this embodiment directly heats the ellipsoidal shell through a power supply, thereby avoiding using a large-sized heating furnace and greatly reducing the manufacturing cost and technical risk of the large-diameter ellipsoidal shells. The aluminum alloy and the welded joints are subjected to gas pressure bulging in a heating state, the formability is significantly improved, and the problem of rapture in the weld zones of the large-diameter aluminum alloy ellipsoidal shell during the normal temperature forming process is solved. By means of current self-resistance heating, the ellipsoidal shell could be heated efficiently and uniformly through the optimal arrangement of electrodes, and the materials for ellipsoidal forming that are difficult to deform at room temperature such as aluminum alloy are realized.

Embodiment 4

As shown in FIGS. 1-5, this embodiment provides an aluminum alloy gas pressure forming method of an ellipsoidal shell based on current self-resistance heating. The formability of the aluminum alloy and the welded joints is improved by means of current self-resistance heating, without using the heating furnace, and the polyhedral shell is pressurized into an ellipsoidal shell by using the compressed gas at high temperature. The polar plates and the ellipsoidal side petal plates are made of 2195 aluminum alloy plates with the thickness of 4.0 mm, the major axis diameter of the ellipsoidal shell is 3,350 mm, and the axial ratio is 2.1. The gas pressure forming method of ellipsoidal shells provided by the present invention includes specific steps as follows.

Step 1, two polar plates and a plurality of ellipsoidal side petal plates are obtained according to a preset axial ratio.

Two polar plates and a plurality of ellipsoidal side petal plates are obtained according to an axial ratio of 2.1, where the angle β is 75° and the diameter of the polar plates is 630 mm. There are 12 side petals, and the side petals are double-curvature arc plates, each of which consists of an elliptical single-curvature arc plate with a major axis diameter of 3,250 mm and an axial ratio of 2.1, and an elliptical single-curvature arc plate with a major axis diameter of 3,200 mm and an axial ratio of 1.2. The boundary point of the two curvature arc plates is a tension-compression boundary design point, and the corresponding angle is calculated according to the following formula:

$$\alpha = \arctan \frac{\sqrt{\lambda^2 - 2}}{\lambda^2}$$

In the formula, a is a spherical center angle formed by the tension-compression boundary design point and the major axis, and A is an axial ratio.

Step 2, the polar plates 1 and the ellipsoidal side petal plates 2 are assembled and welded to form a closed polyhedral shell.

The two polar plates 1 and the 12 ellipsoidal side petal plates 2 are assembled into a polyhedral shell. Multi-point spot welding is carried out on the side edges of the ellipsoidal side petal plates 2 in pairs to assemble the polyhedral shell, one polar plate is welded to the upper edges of the ellipsoidal side petal plates 2, and the other polar plate is welded to the lower edges of the ellipsoidal side petal plates 2, such that the two polar plates 1 and the ellipsoidal side petal plates 2 form a closed ellipsoidal shell; and finally, the assembled polyhedral shell is welded into a closed polyhedral shell. The welding mode is electric arc welding.

Step 3, an electrode is disposed on the closed polyhedral shell to form a closed current loop, and the closed polyhedral shell is energized and heated to a preset forming temperature.

The electrode is disposed on the closed ellipsoidal shell in such a manner that a first electrode 4 is disposed on a first ellipsoidal polar plate, and a second electrode 5 is disposed on a second ellipsoidal polar plate; and an anode of a power supply 6 is connected to the first electrode 4, and a cathode of the power supply 6 is connected to the second electrode 5 to form a closed current loop; and the direct-current power supply is turned on to energize and heat the closed ellipsoidal shell to 350° C. The power supply 6 adopts a direct-current power supply.

Step 4, compressed gas is inflated into the heated closed polyhedral shell.

The compressed gas is inflated into the heated closed polyhedral shell, and the closed polyhedral shell is deformed under the action of internal high-pressure gas. Inflation of the compressed gas is carried out by controlling a gas loading controller 8 to fill the heated closed ellipsoidal shell with the compressed nitrogen in a gas container 9 according to a process curve, and disposing an inflating joint on any of the ellipsoidal side petal plates. The process curve is a pressure-time curve. The pressure intensity of the compressed gas is 0.5 MPa.

Step 5, a curvature change of the closed polyhedral shell after the compressed gas is inflated is detected, and the inflation of compressed gas is stopped when a curvature value of the closed polyhedral shell reaches a preset curvature value, the gas inside the closed polyhedral shell is discharged, and the electrode is removed to obtain a formed ellipsoid. The curvature change of the polyhedral shell is measured by an optical measuring instrument. The major axis diameter of the aluminum alloy ellipsoidal shell is 3,350 mm, and the axial ratio is 2.1.

In conclusion, the ellipsoidal shell hot gas pressure forming method of the present invention adopts a current self-resistance heating mode for directly heating, thereby avoiding using a large-sized heating furnace and greatly reducing the manufacturing cost and technical risk of the large-diameter ellipsoidal shells. The aluminum alloy and the welded joints are subjected to gas pressure bulging in a heating state, the formability is significantly improved, and the problem of rapture in the weld zones of the large-diameter aluminum alloy ellipsoidal shell during the normal temperature forming process is solved.

Each embodiment of the present specification is described in a progressive manner, each embodiment focuses on the difference from other embodiments, and the same and similar parts between the embodiments may refer to each other.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the present invention.

The invention claimed is:

1. A gas pressure forming method of an ellipsoid, wherein the formability of a closed polyhedral shell comprising polar plates, ellipsoidal side flap plates, and welded joints is improved, and the closed polyhedral shell is pressurized into an ellipsoid by using compressed gas under a heating condition, and the method specifically comprises:

step 1, obtaining two polar plates and a plurality of ellipsoidal side flap plates according to a preset axial ratio;

step 2, assembling and welding the polar plates and the ellipsoidal side flap plates to form a closed polyhedral shell;

step 3, disposing an electrode on the closed polyhedral shell to form a closed current loop, and energizing and heating the closed polyhedral shell to a preset forming temperature;

step 4, inflating compressed gas into the heated closed polyhedral shell; and step 5, detecting a curvature change of the closed polyhedral shell after the compressed gas is inflated, and stopping inflating the compressed gas when a curvature value of the closed polyhedral shell reaches a preset curvature value, discharging the gas inside the closed polyhedral shell, and removing the electrode to obtain a formed ellipsoid.

2. The gas pressure forming method of an ellipsoid according to claim 1, wherein in step 2, the welding mode is one of friction stir welding, arc welding, and laser welding.

3. The gas pressure forming method of an ellipsoid according to claim 1, wherein the method of disposing an electrode on the closed polyhedral shell in step 3 specifically comprises: disposing a first electrode and a second electrode on the two polar plates of the closed polyhedral shell, respectively.

4. The gas pressure forming method of an ellipsoid according to claim 1, wherein the method of disposing an electrode on the closed polyhedral shell in step 3 specifically comprises: disposing a first electrode and a second electrode on the two electrode plates of the closed polyhedral shell, respectively; and disposing a third electrode on an equatorial zone of the closed polyhedral shell.

5. The gas pressure forming method of an ellipsoid according to claim 1, wherein the preset forming temperature is 200-500° C.

6. The gas pressure forming method of an ellipsoid according to claim 1, wherein the compressed gas is one of air, nitrogen, and argon, and the pressure intensity of the compressed gas is less than 5 MPa.

7. The gas pressure forming method of an ellipsoid according to claim 1, wherein the preset axial ratio is 0.5-5.

8. The gas pressure forming method of an ellipsoid according to claim 1, wherein the polar plates and the ellipsoidal side flap plates are made of one of 2000-series, 5000-series, 6000-series, 7000-series, and 8000-series aluminum alloys; and the thicknesses of the polar plate and the ellipsoidal side flap plates are less than 30 mm.

* * * * *